(12) United States Patent
Yamakage et al.

(10) Patent No.: US 7,540,427 B2
(45) Date of Patent: Jun. 2, 2009

(54) IC TAG

(75) Inventors: Masateru Yamakage, Matsudo (JP);
Katsuhisa Taguchi, Koshigaya (JP);
Tomoyuki Hasegawa, Saitama (JP);
Toru Takahara, Saitama (JP)

(73) Assignee: Lintec Corporation, Tokyo (JP)

( * ) Notice: Subject to any disclaimer, the term of this patent is extended or adjusted under 35 U.S.C. 154(b) by 117 days.

(21) Appl. No.: 10/514,495

(22) PCT Filed: May 14, 2003

(86) PCT No.: PCT/JP03/06026

§ 371 (c)(1),
(2), (4) Date: Jul. 1, 2005

(87) PCT Pub. No.: WO03/098545

PCT Pub. Date: Nov. 27, 2003

(65) Prior Publication Data

US 2006/0273179 A1   Dec. 7, 2006

(30) Foreign Application Priority Data

May 15, 2002   (JP)   ............... 2002-140535

(51) Int. Cl.
*G06K 19/06*   (2006.01)
(52) U.S. Cl. .................. 235/492; 235/435; 235/488
(58) Field of Classification Search ............ 235/492, 235/439, 449, 451, 487, 488; 428/1.61, 40.1
See application file for complete search history.

(56) References Cited

U.S. PATENT DOCUMENTS

| | | | |
|---|---|---|---|
| 4,717,438 A * | 1/1988 | Benge et al. ................ 156/152 |
| 5,108,819 A * | 4/1992 | Heller et al. ............. 428/195.1 |
| 5,142,270 A * | 8/1992 | Appalucci et al. ......... 340/572.3 |
| 5,528,222 A * | 6/1996 | Moskowitz et al. ....... 340/572.7 |
| 5,767,772 A * | 6/1998 | Lemaire et al. ............. 340/571 |
| 5,842,722 A * | 12/1998 | Carlson ..................... 283/107 |
| 5,884,425 A * | 3/1999 | Baldwin ..................... 40/638 |
| 6,147,604 A * | 11/2000 | Wiklof et al. ............ 340/572.1 |
| 6,270,871 B1 * | 8/2001 | Scholz et al. .............. 428/40.1 |
| 6,569,508 B2 * | 5/2003 | Babb et al. ................. 428/40.1 |
| 6,638,635 B2 * | 10/2003 | Hattori et al. ............... 428/500 |
| 6,830,193 B2 * | 12/2004 | Tanaka ........................ 235/492 |
| 6,888,509 B2 * | 5/2005 | Atherton ..................... 343/718 |

FOREIGN PATENT DOCUMENTS

| | | | | |
|---|---|---|---|---|
| JP | 11078323 A | * | 3/1999 |
| JP | 2000-57292 A | | 2/2000 |
| JP | 2000-105806 A | | 4/2000 |
| JP | 2001-14442 A | | 1/2001 |
| JP | 2001014442 A | * | 1/2001 |
| JP | 2001-167240 A | | 6/2001 |

* cited by examiner

*Primary Examiner*—Seung H Lee
(74) *Attorney, Agent, or Firm*—Sughrue Mion, PLLC

(57) ABSTRACT

The present invention provides an IC tag which has a structure comprising a first adhesive layer formed on a surface of a substrate sheet, an electronic circuit and an IC chip connecting both ends of the electronic circuit, both formed on the surface of the first adhesive layer, and a second adhesive layer covering the electronic circuit and the IC chip. The IC tag further includes a release agent layer formed at positions corresponding to the both ends of the electronic circuit and located at the interface between the substrate sheet and the first adhesive layer. When the IC tag attached to an article is peeled off, the built-in electronic circuit is surely broken.

4 Claims, 2 Drawing Sheets ized to another article intentionally. In such situation, article management can not be correctly conducted longer.

IC TAG

BACKGROUND OF THE INVENTION

1. Field of the Invention

The present invention relates to an IC tag which can break a built-in electronic circuit when the IC tag attached to an article is peeled off.

2. Description of the Prior Art

By attaching an IC tag to articles such as goods, storage articles and loadings, article managements have been conducted recently. For example, the article management has been conducted by attaching an IC tag recorded by information such as production condition, stock state, cost information and used condition to the goods and further confirming the information by an interrogator, according to needs.

However, when the IC tag attached to the article is insufficient in the adhesive strength of the adhesive used in the IC tag, the IC tag may be re-attached to another article by any causes such as errors and careless mistakes. And, the IC tag may be re-attached to another article intentionally. In such situation, article management can not be correctly conducted longer.

DISCLOSURE OF THE INVENTION

As the method for solving the problems described above, it is required to conduct the article management correctly by damaging the function of the IC tag, when the IC tag is re-attached to another article.

As a result of efforts by the present inventors to solve the above-described problems, it was found that the problems described above are achieved by laminating a first adhesive layer on a surface of a substrate sheet, forming an electronic circuit and an IC chip connecting both ends of the electronic circuit on the surface of the first adhesive layer, laminating a second adhesive layer covering the electronic circuit and the IC chip, and forming a release agent layer at positions corresponding to the both ends of the electronic circuit and located at the interface between the substrate sheet and the first adhesive layer. And thus the present invention is completed.

That is to say, the present invention provides an IC tag which has a structure comprising a first adhesive layer laminated on a surface of a substrate sheet, an electronic circuit and an IC chip connecting both ends of the electronic circuit, both the electronic circuit and the IC chip being formed on a surface of the first adhesive layer, and a second adhesive layer laminated for covering the electronic circuit and the IC chip, wherein a release agent layer is further formed at positions corresponding to the both ends of the electronic circuit and located at the interface between the substrate sheet and the first adhesive layer.

The present invention also provides the IC tag as described above, wherein the release agent layer is formed to cover the range of 20 to 90 percents of an area surrounded by an outside circumference of the electronic circuit through the first adhesive layer.

The present invention also provides the IC tag as described above, wherein a release liner is formed on a surface of the second adhesive layer.

In drawings, 1 means a substrate sheet, 2 means a first adhesive layer, 3 means an electronic circuit, 4 means a second adhesive layer, 5 means an IC chip, 6 means a release agent layer, and 7 means a release liner.

DETAILED DESCRIPTION OF THE PREFERRED EMBODIMENTS

Figure 1:
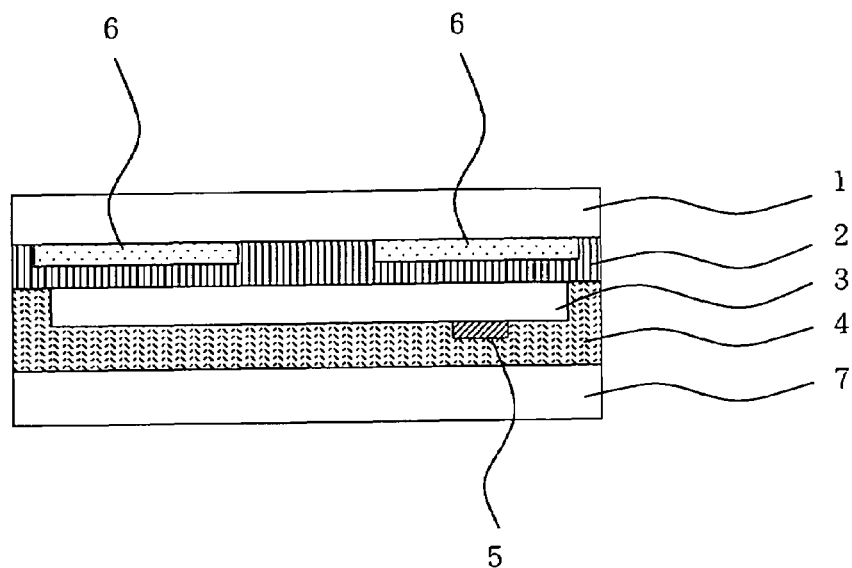
FIG. 1 shows an outline of a cross-section of an IC tag of one embodiment of the invention.

The IC tag of the invention is explained based on the drawings. FIG. 1 shows an outline of a cross-section of an IC tag of one embodiment of the invention.

The substrate sheet 1 is preferably a sheet composed of a thermoplastic resin.

As the sheet composed of the thermoplastic resin, for example, the sheets composed of one or more of various synthetic resins, such as polyolefin resin like polyethylene resins of high density polyethylene, middle density polyethylene, low density polyethylene and the like, polypropylene resins of polypropylene, polymethyl-1-pentene/ethylene/cyclic olefin copolymer, and ethylene-vinyl acetate copolymer; polyester resins like polyethylene terephthalate, polyethylene naphthalate, polybutylene terephthalate; polyvinyl chloride resins; polyvinylalcohol resins; polycarbonate resins; polyamide resins; polyimide resins; fluororesins; copolymers containing two or more polymerization units thereof; polymer blends containing two or more resins thereof; polymer alloys containing one or more resins thereof can be used. In particular, the sheets composed of polyester resins are preferably used. The substrate sheet 1 may be oriented uniaxially or biaxially. The substrate sheet 1 may be composed of single layer or two or more layers of different layers or same layers. Also, the substrate sheet 1 has preferably water resistance. If the substrate sheet has water resistance, a damage such as breaking of the substrate sheet is not caused when the substrate sheet is wet with water.

Thickness of the substrate sheet 1 does not have any limitation. However, the thickness is generally in the range of 10 to 250 μm and preferably in the range of 20 to 100 μm.

For controlling the adhesive strength between the substrate sheet 1 and the first adhesive layer 2, the surface of the substrate sheet 1 can be surface-treated. The surface-treatment includes, for example, corona discharge treatment, chemical treatment, resin-coating and the like.

Adhesives used in the first adhesive layer 2 include various adhesives such as thermo melting adhesives, pressure-sensitive adhesives and thermosetting adhesives. The kinds of the adhesive include, for example, natural rubber adhesives, synthetic rubber adhesives, acrylic resin adhesives, polyester resin adhesives, polyvinyl ether resin adhesives, urethane resin adhesives and silicone resin adhesives.

Examples of the synthetic rubber adhesives include styrene-butadiene rubber, polyisobutylene rubber, isobutylene-isoprene rubber, isoprene rubber, styrene-isoprene block copolymer, styrene-butadiene block copolymer, styrene-ethylene-butylene block copolymer, ethylene-vinyl acetate thermoplastic elastomer and the like. Examples of the acrylic resin adhesives include homopolymers of monomer such as acrylic acid, methyl acrylate, ethyl acrylate, propyl acrylate, butyl acrylate, 2-ethylhexyl acrylate, methyl methacrylate, ethyl methacrylate, butyl methacrylate, and acrylonitrile, or copolymers of 2 or more of monomers thereof. Polyester resin adhesives are copolymers of a polyol and a polybasic acid. The polyol includes ethylene glycol, propylene glycol, and butanediol. The polybasic acid includes terephthalic acid, adipic acid, and maleic acid. Examples of the polyvinyl ether resin adhesives include polyvinyl ether, and polyvinyl isobutyl ether. Examples of the silicone resin adhesives include dimethyl polysiloxane. The adhesives can be used singly or in combination of two or more members.

Among the adhesives, the polyester resin adhesives are preferable.

A tackifier, a softener, an antioxidant, a filler, a coloring agent such as a dye and a pigment or the like can be mixed in the first adhesive layer 2, according to needs.

The tackifier includes rosin resins, terpene phenol resins, terpene resins, aromatic hydrocarbon modified terpene resins, petroleum resins, coumarone-indene resins, styrene resins, phenol resins and xylene resins. The softener includes process oils, liquid rubbers and plasticizers. The filler includes silica, talc, clay, calcium carbonate and the like.

Thickness of the first adhesive layer 2 does not have any limitation. However, the thickness is generally in the range of 3 to 100 µm and preferably in the range of 5 to 50 µm.

In the IC tag of the present invention, the release agent layer 6 is formed at positions corresponding to the both ends of the electronic circuit 3 and located at the interface between the substrate sheet 1 and the first adhesive layer 2.

The release agent layer 6 is formed at positions corresponding to the both ends of the electronic circuit 3, but is not formed at positions corresponding to the center section of the electronic circuit 3. Thus, the first adhesive layer 2 is laminated directly on the surface of the substrate sheet 1 at positions corresponding to the center section of the electronic circuit 3. Therefore, when the IC tag is peeled off after the IC tag is attached to the article, the center section of the electronic circuit 3 is peeled off together with the substrate sheet 1 in the state that the center section of the electronic circuit 3 is attached to the first adhesive layer 2, and then the electronic circuit 3 is cut. The release agent layer 6 is not needed to cover all of positions corresponding to the both ends of the electronic circuit 3. Accordingly, there may be a section at which the release agent layer 6 is not covered.

The release agent layer 6 is formed to cover the range of preferably 20 to 90 percents, more preferably 40 to 80 percents of an area surrounded by an outside circumference of the electronic circuit 3 through the first adhesive layer 2.

The release agent layer 6 is preferably formed as the release agent layer 6 projects over the outside circumference of the electronic circuit 3. The width of the projecting area of the release agent layer 6 does not have any limitation. However, the width is preferably in the range of not less than 1 mm.

The shape of the release agent layer 6 needs the shape capable to form at positions corresponding to the both ends of the electronic circuit 3. The shape of the release agent layer 6 includes preferably triangle, quadrangle, polygons such as pentagon and polygons having more than five angles, ellipse and circle (referred to FIG. 2 and FIG. 3). Two shapes of the release agent layer 6 may be same or different. Two of the release agent layer 6 are preferably separated perfectly and individually, but may be connected at a part of the release agent layer 6.

Release agents used in the release agent layer 6 include, for example, silicone resin, long chain alkyl group-containing resin and fluororesin.

Thickness of the release agent layer 6 does not have any limitation. However, the thickness is preferably in the range of 0.01 to 5 µm and more preferably in the range of 0.03 to 1 µm.

In the IC tag of the present invention, the electronic circuit 3 is formed on a surface of the first adhesive layer 2.

The electronic circuit 3 is a circuit composed of a conductive material. The conductive material includes, for example, metal simple substance such as metallic foil, vapor deposition film and thin film produced by spattering. As the metal simple substance, gold, silver, nickel, copper, aluminium and the like can be used. Also, as the conductive material, conductive pastes produced by dispersing a perticle of metal such as gold, silver, nickel and copper in a binder, can be used.

The average particle diameter of the metal particle is preferably in the range of 1 to 15 µm and more preferably in the range of 2 to 10 µm. The binder includes, for example, polyester resins, polyurethane resins, epoxy resins and phenol resins.

Thickness of the layer of conductive material forming the electronic circuit does not have any limitation. However, the thickness of the metallic foil is preferably in the range of 5 to 50 µm, the thickness of the vapor deposition film or metallic film produced by spattering is preferably in the range of 0.01 to 1 µm and the thickness of conductive paste is preferably in the range of 5 to 30 µm.

The method for forming the electronic circuit 3 on the surface of the first adhesive layer 2, include, for example, a method for forming the electronic circuit 3 by adhering a metallic foil to the substrate sheet 1 with adhesive, etching-treating the metallic foil and then removing sections other than the electronic circuit. The etching-treatment can be conducted by the same treatment as general etching-treatment. The forming of the electronic circuit 3 to the surface of the first adhesive layer 2 can be also conducted by adhering the conductive paste in the shape of the electronic circuit 3 to the surface of the first adhesive layer 2 by means such as printing and application.

Figure 2:
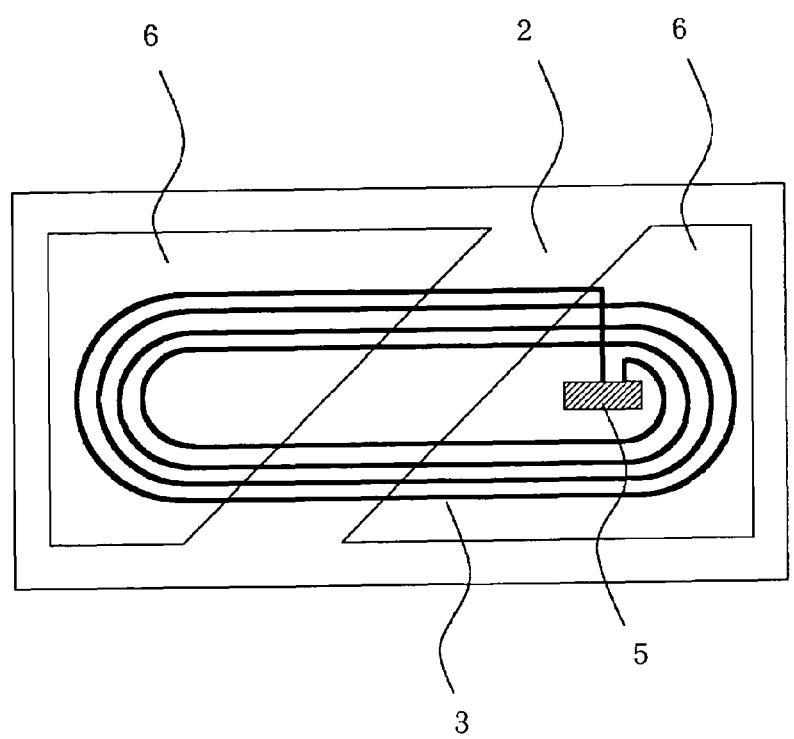
FIG. 2 shows a plane view of an electronic circuit of one embodiment in an IC tag of the invention.
Figure 3:
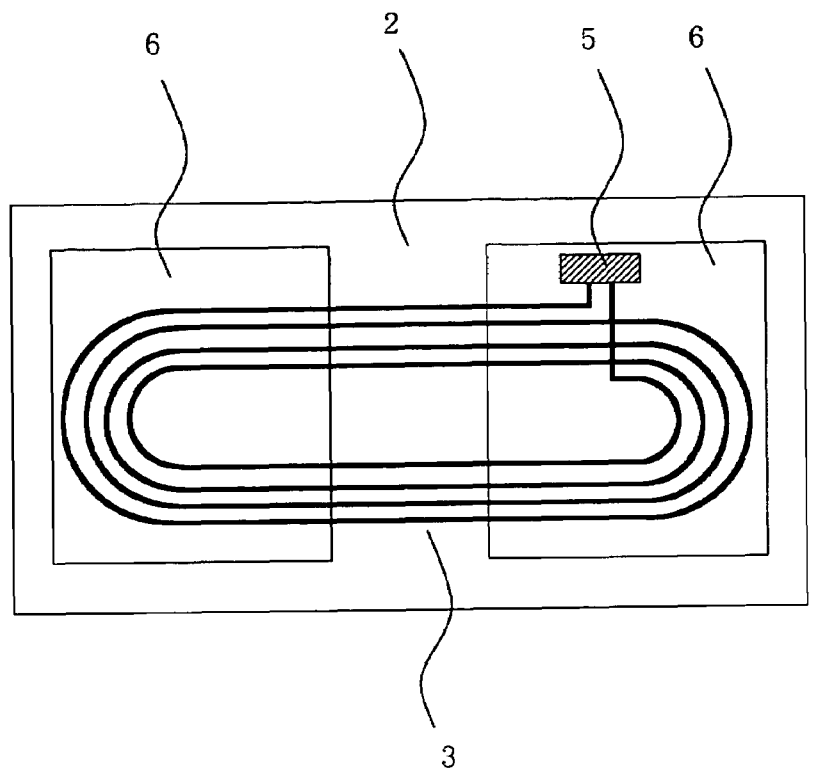
FIG. 3 shows a plane view of an IC tag of other one embodiment of the invention.

The shape of the electronic circuit 3 includes, for example, shapes indicated by FIG. 2 and FIG. 3. In FIG. 2 and FIG. 3, the electronic circuit 3 as an antenna is formed by arranging a line of conductive material in quartet ring having specific space between each lines in the direction from the outside circumference of a rectangle substrate sheet 1 to the inside. The electronic circuit 3 may be arranged in quartet ring as indicated in FIG. 2 and FIG. 3, or may be arranged in singlet ring, doublet ring, triplet ring, or quintet or more ring. The length of the electronic circuit 3 can be preferably controlled in a multiple of the wavelength of the received electric wave.

The IC chip 5 is connected to both ends of the electronic circuit 3. The IC chip 5 can be formed inside of the electronic circuit 3, outside of the electronic circuit 3, or in the upper portion of the electronic circuit 3.

In order to connect the ends of most outside ring and most inside ring of the electronic circuit 3 to the IC chip 5, the end of most outside ring or most inside ring of the electronic circuit 3 is preferably connected to the IC chip 5 by forming the line (jumper circuit) from the end over the ring electronic circuit 3 in direction of the inside or the outside of the electronic circuit 3, without short circuit to the ring electronic circuit 3.

The method for forming the jumper circuit includes a method for forming a conductive circuit line by printing insulating ink in line crossing the portion of the ring electronic circuit 3 from the end of the electronic circuit 3 by screen printing or the like, and then printing conductive paste in line on the printed insulating ink by screen printing or the like. The conductive paste includes that described before. The insulating ink includes light curable ink such as ultraviolet curable ink.

The method for connecting the IC chip 5 to the end of the electronic circuit 3 includes a method for connecting by forming an anisotropic conductive film on the surface of the end of the electronic circuit 3 and then connecting flip-chip bonding method via the anisotropic conductive film. The flip-chip bonding method is a method for conducting easily between the end of the electronic circuit 3 and the IC chip 5 by forming a wire bump to an electrode portion of the IC chip 5, and pressing the surface of the wire bump formed on the IC chip 5 to the anisotropic conductive film covered on the surface of the end of the electronic circuit 3 so that the wire bump insert in the anisotropic conductive film.

In the IC tag of the present invention, the second adhesive layer 4 is laminated to cover the electronic circuit 3, the IC chip 5 and the surface of the first adhesive layer 2 that the electronic circuit 3 is not formed.

Adhesives used in the second adhesive layer 4 include various adhesives such as thermo melting adhesives, pressure-sensitive adhesives and thermosetting adhesives. The kinds of the adhesive include, for example, the same as adhesives used in the first adhesive layer 2, as described before.

The adhesives can be used singly or in combination of two or more members. Among the adhesives, the pressure-sensitive adhesives are preferable and acrylic pressure-sensitive adhesives are more preferable.

The surface of the second adhesive layer 4 is preferably flat.

Thickness of the second adhesive layer 4 does not have any limitation. However, the thickness of the portion covering the electronic circuit 3 and the IC chip 5 is different from the thickness of the portion covering the first adhesive layer 2. Maximum thickness is normally in the range of 10 to 100 μm and preferably in the range of 15 to 50 μm.

The surface of the second adhesive layer 4 can be covered with the release liner 7.

As the release liner 7, any release liners can be used. For example, release liners in which release treatment is conducted to the surface of the substrate to be contacted to the second adhesive layer 4 according to needs, can be used. As the substrate, films composed of various resins such as polyethylene terephthalate, polybutylene terephthalate, polyethylene, polypropylene and polyarylate, and various paper materials such as papers laminated with polyethylene, papers laminated with polypropylene, clay-coated papers, resin-coated papers and glassine papers are illustrated.

In the case, representative examples include a formation of release agent layer composed of release agent such as silicone resin, long-chain alkyl group-containing resin and fluororesin.

The thickness of the release liner 7 does not have any limitation. However, the thickness can be decided properly.

The second adhesive layer 4 can be formed by applying directly to the electronic circuit 3, the IC chip 5 and the surface of the first adhesive layer 2 in which the electronic circuit 3 is not formed. Further, after the second adhesive layer is formed by applying the adhesive on the surface of the release agent layer of the release liner 7, the second adhesive layer can be attached to the electronic circuit 3, the IC chip 5 and the surface of the first adhesive layer 2 in which the electronic circuit 3 is not formed.

Methods for forming the first adhesive layer 3, the second adhesive layer 4 and the release agent layer 6 do not have any limitation, and various methods can be used. The methods include, for example, air knife coater, brad coater, bar coater, gravure coater, roll coater, curtain coater, die coater, knife coater, screen coater, Mayer bar coater and kiss coater.

Figure 4:
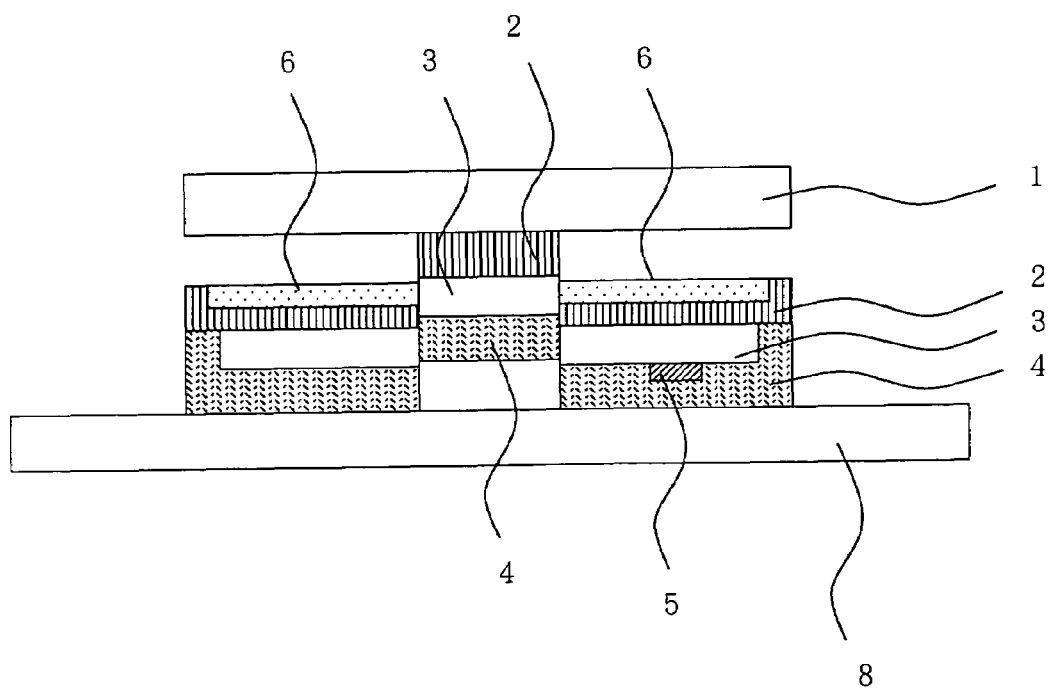
FIG. 4 shows a cross-section of a state that an IC tag of other one embodiment of the invention is peeled off.

When the IC tag is peeled off from the article after the IC tag is attached to the article, the substrate sheet 1 is peeled off at the interface against the release agent layer 6 formed to cover the electronic circuit 3, and the substrate sheet 1 without the release agent layer 6 at the center section of the electronic circuit 3 is peeled off at the interface between the article and the second adhesive layer 4 in the state that the second adhesive layer 4, the electronic circuit 3 and the first adhesive layer 2 are attached to the substrate sheet 1, as indicated in FIG. 4. As the result, the electronic circuit 3 is cut.

When the end portion of the substrate sheet 1 is attached directly to the first adhesive layer 2, the end portion of the substrate sheet 1 may be peeled off at the interface of the substrate sheet 1 and the first adhesive layer 2, or may be peeled off in the layer of the first adhesive layer 2. When the width of the first adhesive layer 2 attached directly to the end portion of the substrate sheet 1 is short, it is preferable because the substrate sheet 1 is peeled off easily at the interface between the substrate sheet 1 and the first adhesive layer 2.

EXAMPLES

The present invention will be explained by an example more concretely in the next paragraph. In addition, the present invention was not restricted at all by these examples.

Example 1

A release agent layer 6 was formed by applying a silincone resin release agent in the shape as indicated in FIG. 2 (having angle of the oblique line in trapezoid of 45°, width of unapplied portion of 3 mm, area covered with two trapezoids and surrounded by an outside circumference of the electronic circuit of about 75 percents of area surrounded by an outside circumference of the electronic circuit, and space length between the end of trapezoid and the substrate sheet 1 of 1 mm), on one surface of polyethylene terephthalate film (having width of 28 mm, length of 12 mm and thickness of 50 μm) in an amount to form the dried thickness of 0.05 μm and then curing at 130° C. for 1 minutes. Next, polyester type thermo melting adhesive (produced by TOYO BOSEKI CO., LTD., trade name "BAYRON 30SS") was applied on the surface of the release agent layer 6 and the substrate sheet 1 by gravure coater in amount to form the dried thickness of 5 μm to laminate the first adhesive layer 2. Further, on the surface of the first adhesive layer 2, an electrolytic copper foil having thickness of 35 μm was heated and pressed by heat seal roll of 100° C. Next, on the surface of the electrolytic copper foil, etching resist ink was printed in quintet ring electronic circuit (antenna) having long side of 25 mm, short side of 6 mm and line width of 0.3 mm by screen-printing method, as indicated in FIG. 2. The printed electrolytic copper foil was etching-treated with a solution of ferric chloride to remove the portion other than the circuit. And then, the etching resist ink was removed with an aqueous alkali solution to form the electronic circuit 3.

In order to conduct the end of most inside ring of the electronic circuit 3 (antenna) and the end of most outside of the electronic circuit 3, an ultraviolet curable ink was printed to the space between them in line shape by screen printing method. And then, ultraviolet light was irradiated to cure the ultraviolet curable ink. Next, a silver paste (average particle diameter of silver particle of 5 μm, binder of polyester resin) was printed in line shape (having length of 10 mm) on the surface of the cured line of the ultraviolet curable ink, and dried to form the jumper circuit.

Next, a wire bump was formed at the electrode portion of an IC chip 5 (produced by PHILIPS CO., trade name of "I/CODE") with a gold wire. The IC chip 5 was connected to the both ends of the circuit through an anisotropic conductive film (produced by SONY CHIMICAL CO., LTD., trade name of "FP2322D") by using the flip chip bonding method.

On the other hand, a release paper having the second adhesive layer 4 was prepared by applying an acrylic pressure-sensitive adhesive having low adhesive strength (produced by LINTEC CORPORATION, trade name of "PA-T1") on the release-treated surface of the release paper obtained by release-treating all surface of one side of a glassine paper having thickness of 70 μm with silicone resin by using roll knife coater, and drying to form the second adhesive layer 4 having thickness of 20 μm.

Next, by attaching the second adhesive layer 4 in the release paper with the second adhesive layer 4 to all of the surface forming the electronic circuit 3 and the IC chip 5 of the substrate sheet 1, the second adhesive layer 4 was covered on the first adhesive layer 2, the electronic circuit 3 and the IC chip 5 to prepare the IC tag.

The obtained IC tag was tested by non-contact transmitting and receiving test. At the result, the transmitting and receiving could be conducted correctly.

The all surface-treated release paper in the IC tag was peeled off, and the IC tag was attached to a polypropylene resin plate. After 24 hours, the IC tag was peeled off from the polypropylene resin plate. The portion of the electronic circuit 3 covered with the release agent layer 6 was remained on the polypropylene resin plate. The portion other than the release agent layer 6 was peeled off from the polypropylene resin plate together with the polyethylene terephthalate sheet of the substrate sheet 1. According to the peeling, the electronic circuit 3 was cut. The peeled IC tag was tested by non-contact transmitting and receiving test. At the result, the transmitting and receiving could be not conducted.

Comparative Example 1

The IC tag were prepared in the same method as described in Example 1 except that the release agent layer 6 was not formed. The obtained IC tag was tested by non-contact transmitting and receiving test. At the result, the transmitting and receiving could be conducted correctly.

The IC tag was attached to the polypropylene resin plate and peeled off in the same method as described in Example 1. The IC tag could be peeled off easily and the electronic circuit 3 was not broken. The peeled IC tag was tested by non-contact transmitting and receiving test. At the result, the transmitting and receiving could be conducted correctly.

When the IC tag attached to an article is peeled off, the built-in electronic circuit can be surely broken.

What is claimed is:

1. An IC tag which has a structure comprising a first adhesive layer laminated on a surface of a substrate sheet, an electronic circuit and an IC chip connecting both ends of a line of the electronic circuit, both the electronic circuit and the IC chip being formed on a surface of the first adhesive layer, and a second adhesive layer laminated for covering the electronic circuit and the IC chip, wherein a release agent layer is further formed at positions corresponding to both separated end sections of the electronic circuit and located at the interface between the substrate sheet and the first adhesive layer, but is not formed at positions corresponding to the center section of the electronic circuit, wherein the release agent layer is formed to cover a range of 20 to 90 percent of an area surrounded by an outside circumference of the electronic circuit throughout the first adhesive layer such that the electronic circuit is rendered electrically inoperable when the substrate is peeled off from the IC tag.

2. The IC tag as claimed in claim 1, wherein a release liner is formed on a surface of the second adhesive layer.

3. The IC tag as claimed in claim 1, wherein the release agent layer is formed of a silicone resin, a long chain alkyl group-containing resin, or a fluororesin.

4. An IC tag comprising:
a first adhesive layer laminated on a surface of a substrate sheet;
an electronic circuit;
an IC chip connecting both ends of a line of the electronic circuit, both the electronic circuit and the IC chip being formed on a surface of the first adhesive layer;
a second adhesive layer laminated for covering the electronic circuit and the IC chip; and
a means for rendering the electronic circuit electrically inoperable when the substrate sheet is peeled off from the IC tag adhered to an adherend, said means including a release agent layer formed at positions corresponding to both separated end sections of the electronic circuit and located at the interface between the substrate sheet and the first adhesive layer, but not formed at positions corresponding to the center section of the electronic circuit.

* * * * *